United States Patent
Wada

(10) Patent No.: US 9,090,359 B2
(45) Date of Patent: Jul. 28, 2015

(54) AIRCRAFT PASSENGER BOARDING BRIDGE HAVING A STEPLESS PASSAGE

(71) Applicant: ANA MOTOR SERVICE CO., LTD, Tokyo (JP)

(72) Inventor: Masafumi Wada, Tokyo (JP)

(73) Assignee: ANA MOTOR SERVICE CO., LTD., Tokyo (JP)

( * ) Notice: Subject to any disclaimer, the term of this patent is extended or adjusted under 35 U.S.C. 154(b) by 0 days.

(21) Appl. No.: 14/379,099

(22) PCT Filed: Feb. 21, 2013

(86) PCT No.: PCT/JP2013/000968
§ 371 (c)(1),
(2) Date: Aug. 15, 2014

(87) PCT Pub. No.: WO2013/125224
PCT Pub. Date: Aug. 29, 2013

(65) Prior Publication Data
US 2015/0082558 A1 Mar. 26, 2015

(30) Foreign Application Priority Data
Feb. 21, 2012 (JP) ................................. 2012-034632

(51) Int. Cl.
*E01D 15/10* (2006.01)
*B64F 1/305* (2006.01)

(52) U.S. Cl.
CPC ................ *B64F 1/305* (2013.01); *E01D 15/10* (2013.01)

(58) Field of Classification Search
CPC ................................. B64F 1/305; E01D 15/10
USPC ............................................................. 14/71.5
See application file for complete search history.

(56) References Cited

U.S. PATENT DOCUMENTS

| 4,553,720 A * | 11/1985 | Harder ........................ 244/137.2 |
| 6,212,724 B1 * | 4/2001 | Zhou .............................. 14/71.5 |
| 6,659,704 B2 | 12/2003 | Fukuhara et al. |
| 7,900,307 B2 | 3/2011 | Okahira et al. |
| 8,104,129 B2 * | 1/2012 | Tang et al. ...................... 14/71.5 |
| 8,302,237 B2 | 11/2012 | Shimizu et al. |
| 2010/0325818 A1 * | 12/2010 | Okahira et al. ................ 14/71.5 |
| 2014/0338138 A1 * | 11/2014 | Karasek ......................... 14/71.5 |

FOREIGN PATENT DOCUMENTS

| JP | 2002-321698 A | 11/2002 |
| JP | 4620747 B2 | 1/2011 |
| JP | 4681626 B2 | 5/2011 |
| JP | 4700643 B2 | 6/2011 |

* cited by examiner

*Primary Examiner* — Raymond W Addie
(74) *Attorney, Agent, or Firm* — Fitzpatrick, Cella, Harper & Scinto

(57) ABSTRACT

The passenger boarding bridge includes a first tunnel including a first fixed passage on which a passenger walks; and a second tunnel including a second fixed passage on which the passenger walks, the first tunnel being inserted into the second tunnel from one end side of the second tunnel, the second tunnel having another end side connected to a cab, the second fixed passage being fixed to the another end side. The second tunnel includes a movable passage including multiple plate floor members in a chain manner, the movable passage having one end fixed to the second fixed passage of the second tunnel in a pivotable manner. Accordingly, a passenger boarding bridge in which a passage level difference is eliminated at a joint part between an inner tunnel and an outer tunnel can be realized.

10 Claims, 4 Drawing Sheets

AIRCRAFT PASSENGER BOARDING BRIDGE HAVING A STEPLESS PASSAGE

TECHNICAL FIELD

The present invention relates to a passenger boarding bridge (hereinafter referred to as "PBB") which is equipped in airports, for enabling passengers to board a passenger aircraft.

BACKGROUND ART

In a passenger aircraft (hereinafter referred to as "aircraft"), passengers board or disembark from (hereinafter referred to as "board and the like") the aircraft through a doorway provided to an airframe. Between the doorway and a gate provided in the airport building, a PBB is installed. Normally, the PBB is stored in a contracted state when no passengers and the like are boarding. At the time of boarding and the like of the passengers on the aircraft, the PBB extends toward the doorway of the aircraft to connect to the doorway of the aircraft. The PBB is fixed after being substantially matched with the doorway of the aircraft, to thereby enable the passengers and the like to board and the like through the doorway.

The PBB generally includes an inner tunnel (first tunnel) and an outer tunnel (second tunnel). The inner tunnel and the outer tunnel are each a hollow member through which the passengers are walkable, and are configured so that the outer tunnel has an outer shape larger than the cross section of the inner tunnel, and the inner tunnel is telescopically inserted into the outer tunnel from one end side thereof. The outer tunnel is supported by a drive column, and the drive column includes a wheel for moving on the ground. Through running of the drive column, the outer tunnel is moved to relatively approach the inner tunnel and overlap with the inner tunnel, thereby contracting the PBB. On the other hand, when the outer tunnel is moved to relatively separate from the inner tunnel, the PBB extends. The inner tunnel is connected to the airport building through intermediation of a rotunda. On the other hand, a cab is arranged on an end portion of the outer tunnel on a side opposite to one end at which the inner tunnel is inserted, that is, the other end side (aircraft side) of the outer tunnel. An end portion of the cab, which is situated on the side opposite to the side on which the outer tunnel is connected, is connected to the doorway of the aircraft.

The PBB has a structure in which the inner tunnel is inserted into the outer tunnel having a larger outer shape in cross section. Therefore, there has been a problem in that, at a joint part between the outer tunnel and the inner tunnel, a level difference is generated in the passage floor surface on which the passengers and the like walk. Such a level difference in the floor surface is dangerous because the passengers may fall during walking. Further, the level difference causes great inconvenience in running by a wheelchair or conveyance of a wheeled baggage. As a PBB that eliminates such a passage level difference inside the PBB, for example, Patent Literatures 1 to 3 below disclose a PBB including a continuous floor that is mountable and fixable to the inner tunnel. In particular, in Patent Literature 1 as a representative example thereof, for example, a sprocket is arranged on the lower side of the inner tunnel. The mechanism is as follows. When the inner tunnel and the outer tunnel move relatively to each other to contract the PBB, a floor surface of the passage of the outer tunnel approaches the inner tunnel. Therefore, a floor surface fixed to the inner tunnel is guided by the sprocket toward the opposite direction to be wound by a rope retractor to be shortened.

CITATION LIST

Patent Literature

PTL 1: Japanese Patent No. 4700643
PTL 2: Japanese Patent No. 4620747
PTL 3: Japanese Patent No. 4681626

SUMMARY OF INVENTION

Technical Problem

As described above, it is inconvenient and dangerous when a level difference is generated at the joint part between the outer tunnel and the inner tunnel in the passage floor surface on which the passengers and the like walk. However, when the continuous floor is fixed to the inner tunnel as disclosed in Patent Literatures 1 and 2, it is necessary to guide the continuous floor by the sprocket on the inner tunnel side in the opposite direction and wound the continuous floor by the rope retractor. This method has a problem of increase in the structure for wounding the passage floor surface, including the sprocket.

Solution to Problem

An object of the present invention is to eliminate a level difference in a floor surface at a connection portion between an inner tunnel and an outer tunnel with a simple structure.

Another object of the present invention is to provide an aircraft passenger boarding bridge, including a first tunnel (3) including a hollow portion and a first fixed passage (11) on which a passenger walks, in the hollow portion, and a second tunnel (2) into which the first tunnel (3) is inserted from one end side (2b) of the second tunnel (2), the second tunnel (2) including a hollow portion and a second fixed passage (10a) on which a passenger walks, wherein the second tunnel (2) having another end side (2a) connected to a cab (5), the second fixed passage (10a) being fixed to the another end side (2a), wherein the second tunnel (2) comprises a movable passage (10b) including multiple plate floor members (100) chained with each other, each of the multiple plate floor members (100) being pivotably connected with each other at an edge side (100a), one end of the movable passage (10b) being pivotably connected to the second fixed passage (10a) of the second tunnel (2), wherein a passage surface height of the movable passage (10b) is the same as a passage surface height of the first fixed passage (11) of the first tunnel (3).

A further object of the present invention will become apparent from the following description of exemplary embodiments with reference to the attached drawings.

Advantageous Effects of Invention

According to the PBB of the present invention, it is possible to eliminate a passage level difference in the floor surface at the connection portion between the inner tunnel and the outer tunnel with a simple structure.

DESCRIPTION OF EMBODIMENTS

First Embodiment

Figure 1:
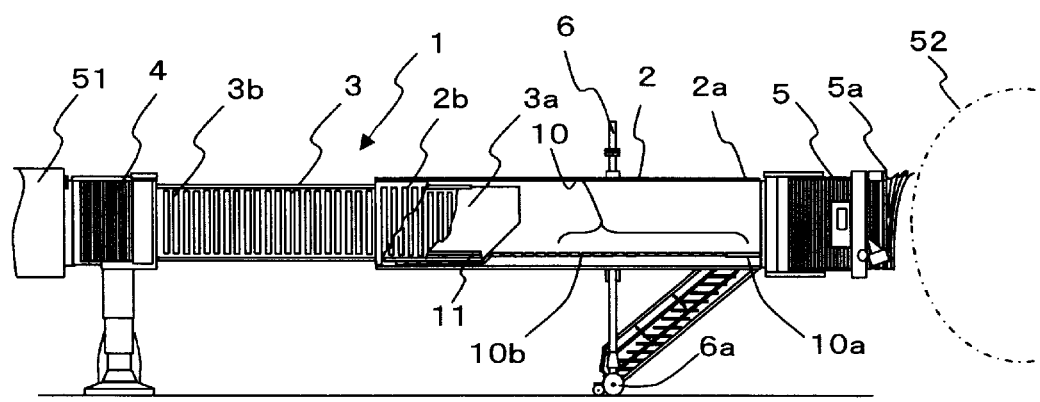
FIG. 1 is an external view illustrating a PBB according to a first embodiment of the present invention under a state in which the PBB is extended to be connected to an aircraft, and illustrating an inside of an outer tunnel in cross section.
Figure 2:
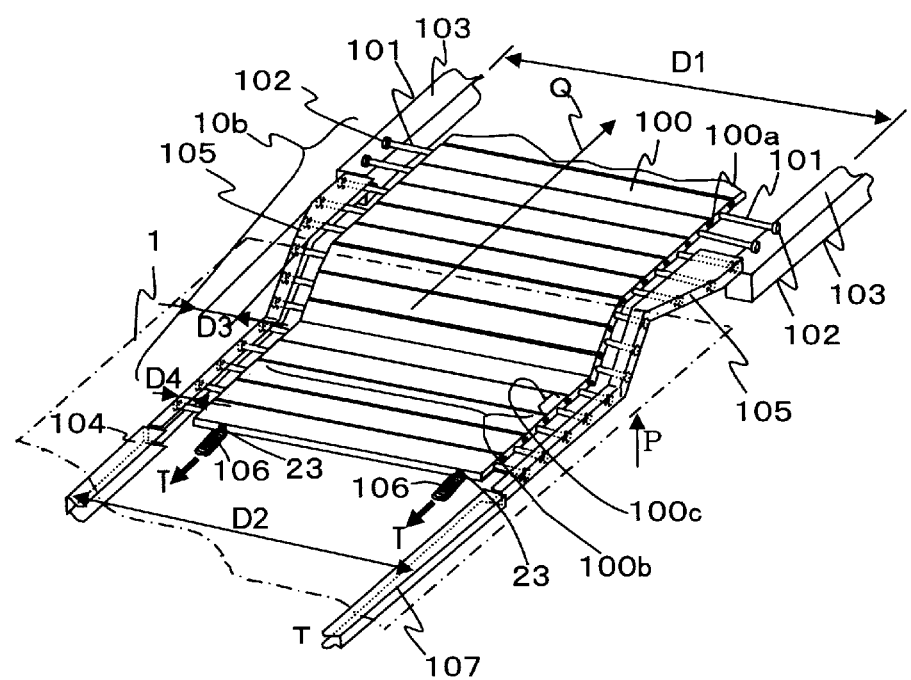
FIG. 2 is a view illustrating a position at which a movable passage is accommodated in an inner tunnel.
Figure 3:
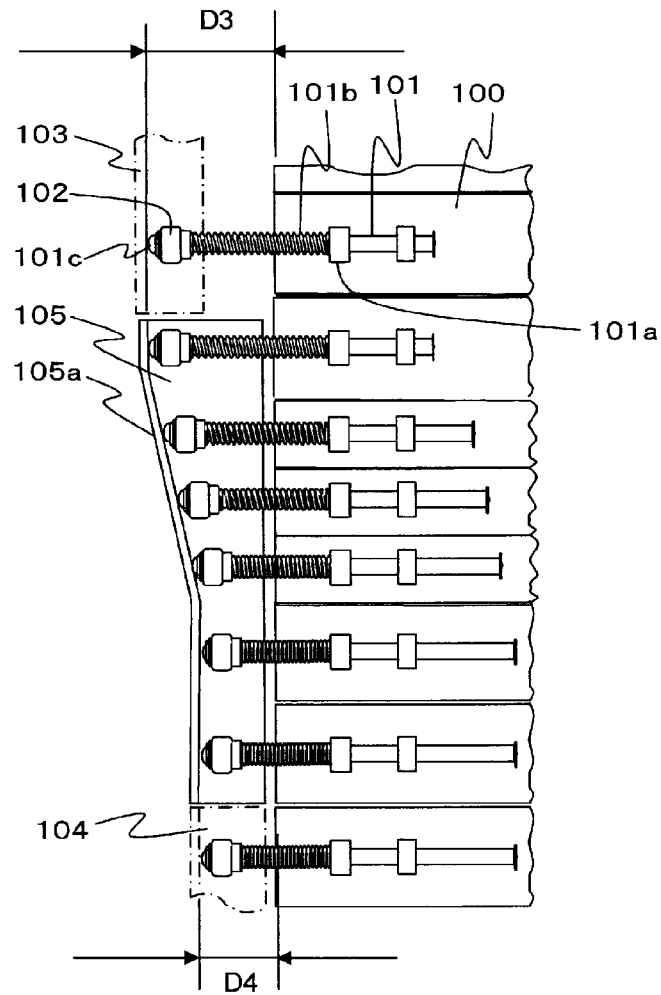
FIG. 3 is a view illustrating a support portion of the movable passage.

With reference to FIGS. 1 to 3, a most general PBB according to a first embodiment of the present invention is described. FIG. 1 is an external view illustrating a PBB 1 according to the present invention under a state in which the PBB 1 is extended to be connected to an aircraft, and illustrating an inside of an outer tunnel in cross section.

The PBB 1 includes an outer tunnel 2 and an inner tunnel 3. Each of the outer tunnel 2 and the inner tunnel 3 are each a hollow member having a passage on which passengers walk. The outer tunnel 2 has an outer shape larger than the cross section of the inner tunnel 3, and the inner tunnel 3 is inserted into the outer tunnel 2 from one end side thereof. The PBB 1 is capable of extending when the outer tunnel 2 and the inner tunnel 3 relatively move away from each other, or contracting when the outer tunnel 2 and the inner tunnel 3 relatively move closer to each other. The inner tunnel 3 is connected to a fixed bridge 51 of the airport building through intermediation of a rotunda 4. The PBB 1 is pivotable about the rotunda 4. On the other hand, a cab 5 is connected to the outer tunnel 2 on the aircraft side. The cab 5 is rotatable with respect to the outer tunnel 2, and has an opening in part. A bellows 5a is mounted around the opening. The cab 5 is rotated to move its opening toward a position opposed to a door of an aircraft 52, and the bellows 5a is extended to be brought into contact with the airframe, thereby isolating the inside of the PBB 1 from the outside. In the following, in this specification, one end of each of the cab, the outer tunnel, and the inner tunnel on the aircraft side is defined as a "front end," and the other end thereof on the rotunda side is defined as a "rear end."

The outer tunnel 2 has its substantially center part fixed to and supported by a drive column 6. The drive column 6 includes a wheel 6a which moves on the ground of the airport by a drive mechanism (not shown). The drive column 6 can move in a direction separating from or approaching the rotunda 4. A contracted state of the PBB 1 corresponds to a state in which the front end of the inner tunnel 3 makes its closest approach to the front end of the outer tunnel 2, and the outer tunnel 2 overlaps with the inner tunnel 3. An extended state of the PBB 1 corresponds to a state in which the front end of the inner tunnel 3 is most separated from the front end of the outer tunnel 2. When the PBB 1 is extended from the contracted state, the outer tunnel 2 is moved so that the front end thereof is relatively separated from the front end of the inner tunnel 3. On the other hand, when the PBB 1 is contracted from the extended state, the outer tunnel 2 is moved so that the front end thereof relatively approaches the front end of the inner tunnel 3.

Inside the inner tunnel 3, a fixed passage (first fixed passage) 11 is arranged. In the outer tunnel 2, a passage floor 10 is arranged. The passage floor 10 includes a fixed passage (second fixed passage) 10a and a movable passage 10b. The second fixed passage 10a is fixed to an inside of the outer tunnel 2 on a front end 2a side, and is set to have the same height as the floor inside the cab 5. The movable passage 10b has a structure in which multiple plate floor members 100 are coupled in a chain manner in a passage direction of the outer tunnel 2, wherein adjacent multiple plate floor members 100 are coupled on each edge side 100b of the longitudinal direction of the multiple plate floor members 100 corresponding to the floor width of the passage floor 10. The movable passage 10b including the coupled members has one end fixed to an end portion of the second fixed passage 10a on a side opposite to the cab 5. The movable passage 10b enters below the first fixed passage 11 of the inner tunnel 3 from a position at which the movable passage 10b approaches closest to the first fixed passage 11 of the inner tunnel 3 on a front end 3a side. The height of the passage surface of the movable passage 10b of the outer tunnel 2 is set to be substantially the same as the height of the passage surface of the first fixed passage 11 of the inner tunnel 3. A bridge plate may be arranged between the passage surface of the first fixed passage 11 of the inner tunnel 3 and the passage surface of the movable passage 10b of the outer tunnel 2.

The mechanism of the movable passage 10b to enter below the first fixed passage 11 of the inner tunnel 3 is described in detail with reference to FIGS. 2 and 3. FIG. 2 is a view of the position at which the movable passage 10b enters below the first fixed passage 11 of the inner tunnel 3 as viewed from the obliquely upper side. FIG. 3 is a view of the position at which the movable passage 10b enters below the first fixed passage 11 of the inner tunnel 3 as viewed from the passage lower side (from an arrow P of FIG. 2).

As illustrated in FIG. 2, the movable passage 10b includes the multiple flat plate floor members 100 which are coupled in a chain manner along the longitudinal direction (an arrow Q direction) of the passage of the outer tunnel 2. Now, description is made focusing on a single plate floor member 100. Other plate floor members 100 forming the movable passage 10b have a similar configuration.

The plate floor member 100 is a rectangular flat plate-shaped member, and includes a hinge 100a on each two edge sides 100b in the longitudinal direction of the plate floor member 100. The hinge 100a connects adjacent plate floor members 100 to each other in a pivotable manner. Further, the plate floor member 100 includes a support rod 101 on each two edge sides 100c in the lateral direction of the plate floor member 100, the support rod being arranged so as to extend in the longitudinal direction of the plate floor member 100. That is, the support rod 101 is arranged so as to extend in a direction orthogonal to the direction in which the multiple coupled flat plate floor members 100 extend. A rotatable roller 102 is rotatably mounted around a shaft of the support rod 101 at a tip of the end of the support rod 101. A ball bearing 101c is mounted to the leading end of the support rod 101. The support rod 101 is inserted into, for example, a bush 101a mounted on a back surface of the plate floor member 100 so as to be reciprocable in the longitudinal direction of the plate floor member 100. Further, the support rod 101 includes a biasing spring 101b mounted between the roller 102 and the bush 101a. The biasing spring 101b has one end fixed to the support rod 101, and the other end fixed to the plate floor member 100. With this, the support rod 101 is biased in a direction in which the support rod 101 jumps out and extends along the longitudinal direction of the plate floor member 100. Under this state, the support rod 101 can be contracted in a direction opposite to the biasing direction along the longitudinal direction of the plate floor member.

Inside the outer tunnel 2, outer guide rails (first guide rails) 103 are arranged in a pair along the extending direction (the arrow Q direction) of the movable passage 10b. In the inner tunnel 3, inner guide rails (second guide rails) 104 are arranged in a pair. The outer guide rail 103 pair and the inner guide rail 104 pair are guide rails on which the rollers 102 roll. Each of the inner guide rails 104 in a pair has a sectional shape as a C-shaped channel member, for example. In the inner guide rail 104 pair, the roller 102 rolls on the inner surface of the inner guide rail 104. The outer guide rails 103 and the inner guide rails 104 both in pairs are respectively arranged parallel so as to sandwich the movable passage 10b. The inner tunnel 3 is inserted into the outer tunnel 2, and hence the width inside the inner tunnel 3 is smaller than that inside the outer tunnel 2. Therefore, it is necessary to reduce the width of the support rod 101 in the case where the support rod 101 is supported by the inner guide rail (second guide rail) 104, as compared to the case where the support rod 101 is supported by the outer guide rail (first guide rail) 103. In view of this, the width of a wall surface of each guide rail forming the inner guide rail 104 pair is set so as to be narrowed to a position with a width of D4 in a part where the roller 102 is placed on a rolling surface of each of the guide rails forming the inner guide rail 104 pair. That is, when the distance from one guide rail to the other guide rail forming the outer guide rail 103 pair is D1, and the distance between respective inner wall surfaces of the guide rails forming the inner guide rail 104 pair is D2, the guide rails are arranged so that D2 is smaller than D1 and the inner guide rail 104 pair is arranged on the inner side of the guide rails forming the outer guide rail 103 pair.

In order to enable the movable passage 10b to enter below the first fixed passage 11 of the inner tunnel 3 when the outer tunnel 2 approaches the inner tunnel 3, a roller rolling surface on which the roller 102 rolls on each guide rail forming the outer guide rail 103 pair is set to be higher than a roller rolling surface on which the roller 102 rolls in each guide rail forming the inner guide rail 104 pair. This height corresponds to the amount for the movable passage 10b to enter below the first fixed passage 11. It is preferred that the inner guide rail 104 pair be arranged so that the roller rolling surface in the inner guide rail 104 extends parallel substantially along the first fixed passage 11. With this, the movable passage 10b enters below the first fixed passage 11 of the inner tunnel 3 while maintaining a state in which the passage surface for the passengers and the like of the surface of the movable passage 10b is opposed to the surface of the first fixed passage 11 and is parallel to the first fixed passage 11.

In the single plate floor member 100, a width between a leading end of the support rod 101 extending from one lateral side of the plate floor member 100 and a leading end of the support rod 101 extending from the other lateral side of the plate floor member 100 is set to a width that enables the rollers 102 to roll while being placed on the guide rails forming the outer guide rail 103 pair under a state in which the support rods 101 are protruding. Further, the above-mentioned width is set to a width that enables the rollers 102 to roll while being placed in the guide rails forming the inner guide rail 104 pair under a state in which the support rods 101 are pushed in. Under a state in which the rollers 102 are placed on the roller rolling surfaces on the guide rails forming the outer guide rail 103 pair, the upper surface of the plate floor member 100 has a height as the passage surface (movable passage 10b) of the outer tunnel 2 in a state in which the passengers are walkable. Further, under a state in which the rollers 102 are placed on the roller rolling surfaces in the guide rails forming the inner guide rail 104 pair, the surface of the plate floor member 100 has a height as the passage surface (movable passage 10b) of the outer tunnel 2 in a state in which the PBB 1 is stored. The first fixed passage 11 of the inner tunnel 3 is fixed to the inner tunnel 3 so that the passage surface of the first fixed passage 11 is to be on the same height as the upper surface of the plate floor member 100 in a state in which the rollers 102 are placed on the guide rails forming the outer guide rail 103 pair. Therefore, when the rollers 102 of the support rods 101 of the plate floor member 100 are located on the guide rails forming the outer guide rail 103 pair, no level difference is made between the passage floor surface of the outer tunnel 2 and the passage floor surface of the inner tunnel 3. Note that, the roller 102 need not be supported by the support rod 101, and need not run on the rolling surface of the guide rail. For example, a groove may be formed in each of the outer guide rail 103 pair and the inner guide rail 104 pair, and the support rod 101 may be inserted into the groove to move along the groove, thereby controlling the movement of the plate floor member 100 in the height direction. Further, the roller 102 is arranged at a part different from the support rod 101 to enable smooth movement of the plate floor member 100. As described above, the roller 102 and the support rod 101 can be arranged in a separated manner.

A roller guide 105 is arranged so that the roller 102 is transferred from a region on the roller rolling surface on each guide rail forming the outer guide rail 103 pair to a region on the roller rolling surface in each guide rail forming the inner guide rail 104 pair. The roller guide 105 includes a wall surface 105a perpendicular to the axial direction of the support rod 101. For example, in a part in which the roller 102 is located on the rolling surface on each guide rail forming the outer guide rail 103 pair, the wall surface 105a is arranged at a position at a distance D3 from an edge surface of the plate floor member 100 (hereinafter referred to as "part corresponding to the outer tunnel 2"). Further, the roller guide 105 includes, at a position with a width D4 from the edge surface of the plate floor member 100, a wall surface perpendicular to the axial direction of the support rod 101 (hereinafter referred to as "part corresponding to the inner tunnel 3"). In this case, the width D4 is set smaller than the width D3. With this, the endmost portion of the support rod 101 is brought into contact with the wall surface so that the roller 102 on the rolling surface of each guide rail forming the outer guide rail 103 pair is transferred onto the rolling surface in each guide rail forming the inner guide rail 104 pair. That is, the support rod 101 pushed by the wall surface enters the bush 101a against the biasing force of the biasing spring 101b, and contracts inwardly with respect to the edge surface of the plate floor member 100. As the width between the wall surface of the roller guide 105 and the edge surface of the plate floor member 100 becomes smaller from the wall surface position of the "part corresponding to the outer tunnel 2" to the wall surface position of the "part corresponding to the inner tunnel 3," the wall surface of the roller guide 105 pushes the support rod 101. The ball bearing 101c at the leading end of the support rod 101 reduces the frictional force generated when the support rod 101 moves on the wall surface of the roller guide 105.

The height of the "part corresponding to the outer tunnel 2" corresponds to the height at a location at which the roller 102 is placed on each guide rail forming the outer guide rail 103 pair, and the height of the "part corresponding to the inner tunnel 3" corresponds to the height at a location at which the roller 102 is placed in each guide rail forming the inner guide rail 104 pair for guiding the roller. Further, the roller guide 105 includes, in a part from the "part corresponding to the outer tunnel 2" to the "part corresponding to the inner tunnel 3," a transition part having an inclination surface that enables the roller 102 to change its height while rolling from the "part corresponding to the outer tunnel 2" to the "part corresponding to the inner tunnel 3." Various structures can be considered as the roller guide 105, but a roller guide having a C-shaped cross section may be adopted from the "part corresponding to the outer tunnel 2" to the "part corresponding to the inner tunnel 3," in which a wall surface, which is perpendicular to the axial direction of the support rod 101 and on the outer side of the support rod 101, connects an upper surface and a lower surface which sandwich the roller 102 from upper and lower sides in parallel to the surface of the plate floor member 100. Further, it is also possible to set the roller guide 105 so that, in the transition part from the "part corresponding to the outer tunnel 2" to the "part corresponding to the inner tunnel 3," the width of the wall surface is reduced in the "part corresponding to the outer tunnel 2" to connect to the "part corresponding to the inner tunnel 3," or the width of the wall surface is gradually reduced while connecting from the "part corresponding to the outer tunnel 2" to the "part corresponding to the inner tunnel 3."

Figure 4:
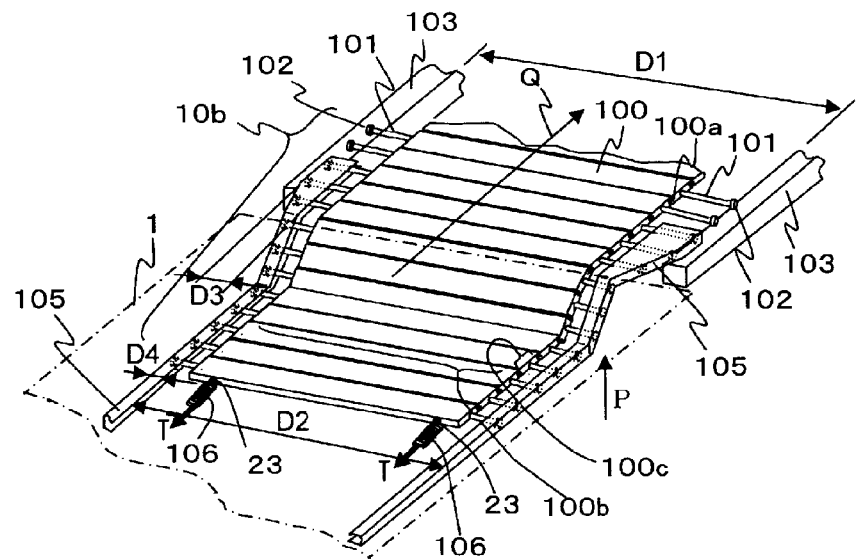
FIG. 4 is a view illustrating a position at which the movable passage is accommodated in the inner tunnel in an embodiment without an inner guide rail.
Figure 5:
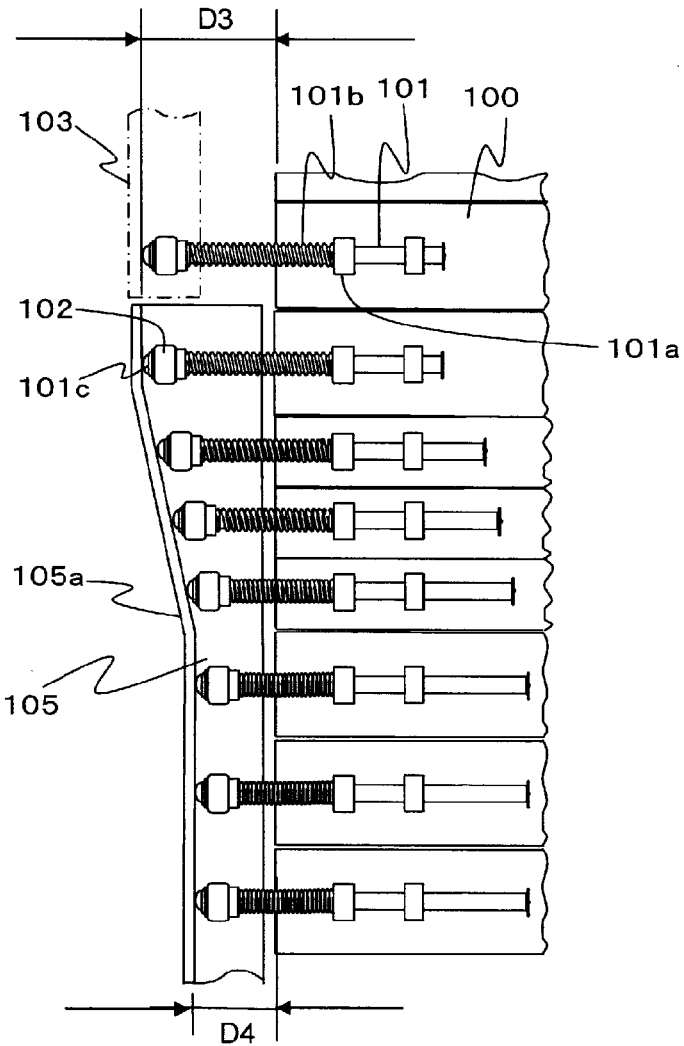
FIG. 5 is a view illustrating the support portion of the movable passage in the embodiment without the inner guide rail.

As another embodiment, there is a method of omitting the inner guide rail 104. In this case, for example, as illustrated in FIGS. 4 and 5, instead of providing the inner guide rail 104, the roller guide 105 is arranged in an extended manner. In this case, the roller guide 105 has a roller rolling surface that is parallel substantially along the first fixed passage 11 as in the case where the inner guide rail 104 is arranged so that the roller rolling surface in the inner guide rail 104 extends parallel substantially along the first fixed passage 11. In this case, the roller guide 105 functions as the inner guide rail 104 (second guide rail) below the first fixed passage 11. With this, similarly to the case where the inner guide rail 104 is arranged, the movable passage 10b enters below the first fixed passage 11 of the inner tunnel 3 while maintaining a state in which the passage surface for the passengers and the like of the surface of the movable passage 10b is opposed to the surface of the first fixed passage 11 and is parallel to the first fixed passage 11. Further, the support rod 101 moves along the roller guide 105 through the rolling of the roller 102, and the plate floor member 100 moves from a part of the outer guide rail 103 pair (outer tunnel 2) to the part of the inner tunnel 3.

When the inner tunnel 3 moves relatively to the outer tunnel 2 to be housed in the outer tunnel 2, the roller 102 moves from the outer guide rail 103 pair via the roller guide 105 to the inner guide rail 104 pair so that the plate floor member 100 of the movable passage 10b enters below the first fixed passage 11 of the inner tunnel 3. In an actual case, when the roller 102 moves from the outer guide rail 103 pair via the roller guide 105 to the inner guide rail 104 pair, due to friction, the plate floor member 100 on the inner tunnel 3 side cannot move in a planar state. Therefore, it is necessary to apply an appropriate tension to all of the plate floor members 100 of the movable passage 10b. Therefore, in the movable passage 10b, the plate floor member 100 closest to the inner tunnel 3 is applied with such a tension T that the movable passage 10b is pulled on both the front end and rear end sides as in a direction indicated by arrows of FIG. 2 or 4 by a tension application device 106. With the tension T, the movable passage 10b forms a flat passage surface without unevenness. As the tension application device 106, for example, various types of springs or various kinds of cylinders (e.g. air cylinder or oil cylinder) or dumpers are applicable. As long as it causes an appropriate tension to extend the movable passage 10b, any kind of member can be used as the tension application device 106.

As illustrated in FIG. 2 or 4, as a method of applying the tension T for pulling the movable passage 10b on both the front end and rear end sides of the outer tunnel 2, there are a method of applying the tension T to the movable passage 10b only in the outer tunnel 2, and a method of applying the tension to the movable passage 10b in the outer tunnel 2 and the inner tunnel 3.

Figure 6:
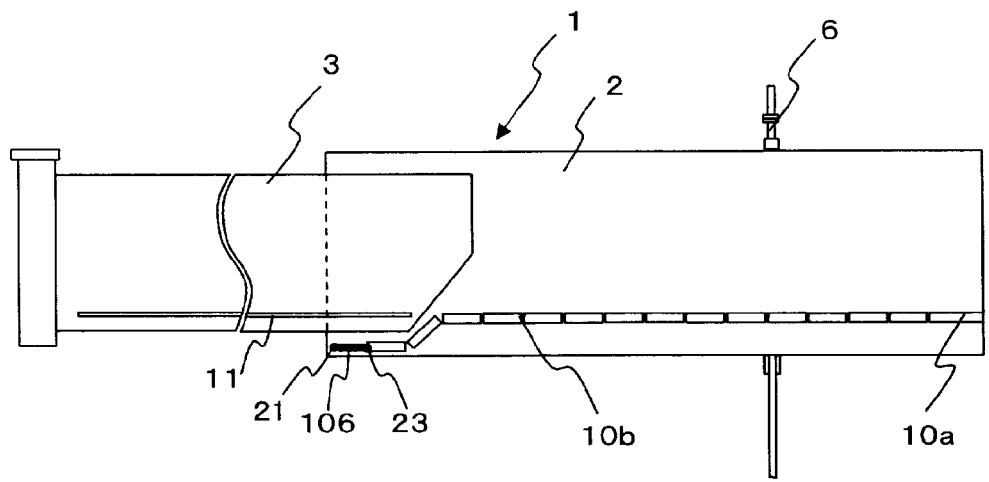
FIG. 6 is an embodiment of the PBB in which the tension is applied to the movable passage by only the outer tunnel.

First, description is made of the former case of the method of applying the tension T on both the front end and rear end sides of the movable passage 10b with reference to FIG. 6. The tension application device 106 has one end mounted to a fixed point 21 of the outer tunnel 2 at an arbitrary position on the rear end side. The tension application device 106 has the other end mounted to the rear end of the movable passage 10b, that is, a fixed point 23 arranged on the plate floor member 100 on the rear end side of the movable passage 10b. The fixed point 23 is generally arranged on the rearmost end side of the plate floor member 100 on the rearmost end side of the movable passage 10b. However, as long as the tension T is applied on both the front and rear end sides of the movable passage 10b, it is not necessary to arrange the fixed point 23 on the plate floor member 100 on the rearmost end side of the movable passage 10b, and further, it is not necessary to arrange the fixed point 23 on the rearmost end side of the plate floor member 100.

The fixed point 21 is positioned to be on the rear end side with respect to the fixed point 23 in the outer tunnel 2. At this time, the tension application device 106 is adjusted so that the tension T is applied to both the front and rear end sides of the movable passage 10b to pull the fixed point 21 and the fixed point 23. For example, when a spring is applied to the tension application device 106, the spring is set to have a length that pulls the fixed point 21 and the fixed point 23. The tension T is set to a level that enables the movable passage 10b to form a flat passage surface without unevenness even when the outer tunnel 2 and the inner tunnel 3 move relatively to each other. It is more desired to set the level so that, as long as this state is maintained, no excessive pulling force is generated between the respective plate floor members 100 of the movable passage 10b. Here, although it is described that the tension application device 106 is arranged to pull the fixed point 21 and the fixed point 23 as an embodiment, a wire or wires (not shown) can be arranged between the tension application device 106 and the fixed point 21 and/or between the tension application device 106 and the fixed point 23 to apply the tension T to pull the fixed point 21 and the fixed point 23.

Figure 7:
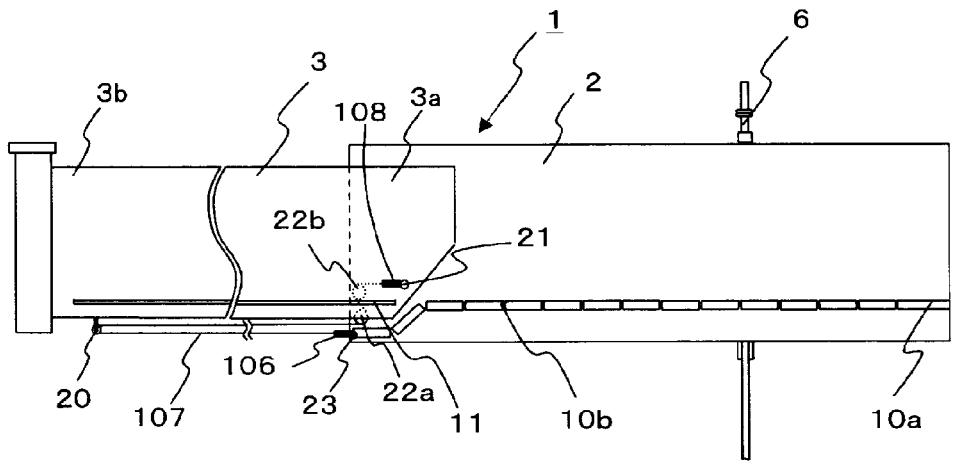
FIG. 7 is another embodiment of the PBB in which the tension to the movable passage by the outer tunnel and the inner tunnel, illustrating a state of the movable passage when the PBB is extended.
Figure 8:
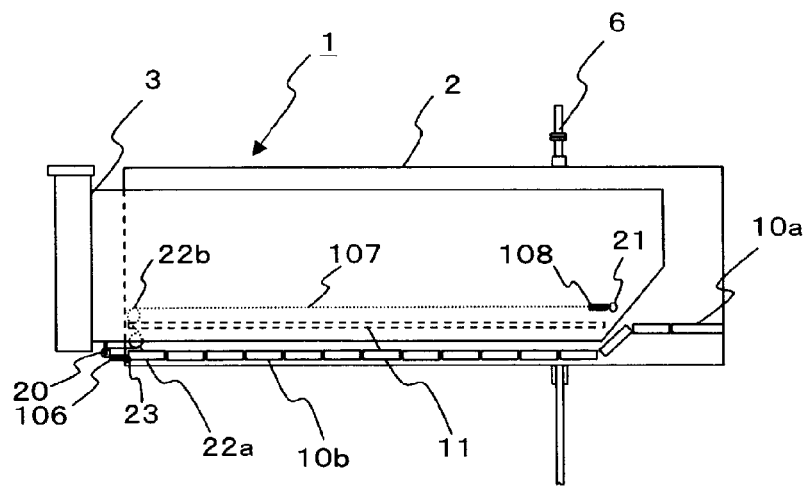
FIG. 8 is another embodiment of the PBB in which the tension to the movable passage by the outer tunnel and the inner tunnel, illustrating a state of the movable passage when the PBB is contracted.

Subsequently, description is made of the latter case of the method of applying the tension to the movable passage 10b in both the outer tunnel 2 and the inner tunnel 3 with reference to FIGS. 7 and 8. This method has in common with the former method that the fixed point 23 is arranged on the rear end of the movable passage 10b of the outer tunnel 2. However, this method is different from the former method in that the fixed point 21 is arranged in the inner tunnel 3. FIG. 7 illustrates an extended state in which the PBB 1 is extended and the inner tunnel 3 is protruded from the outer tunnel 2. FIG. 8 illustrates a state in which, from the extended state, the outer tunnel 2 and the inner tunnel 3 are moved relatively to each other so that the inner tunnel 3 is housed in the outer tunnel 2, to thereby contract the PBB 1. In this method, with the movement of the inner tunnel 3, the tension T is applied to the movable passage 10*b* so that both the front and rear end sides thereof are pulled.

The tension application device 106 has one end connected to the fixed point 23 of the plate floor member 100. Further, a pulley 20 is arranged on a rear end portion 3*b* of the inner tunnel 3. A wire 107 is looped around the pulley 20, and has one end connected to the fixed point 23 and the other end passing from the pulley 20 via a tension application device 108 to be fixed to the fixed point 21 arranged on the front end 3*a* side of the inner tunnel 3. The wire 107 has the one end mounted to the fixed point 23 located on the rear end side of the plate floor member 100 of the outer tunnel 2, and the other end mounted to the fixed point 21 of the inner tunnel 3, and both of those ends are arranged on the front end side of the PBB 1 with respect to the pulley 20 located at the rear end portion 3*b* of the inner tunnel 3. The plate floor member 100 is fixed to the outer tunnel 2, and hence, as the outer tunnel 2 and the inner tunnel 3 move relatively to each other so that the PBB 1 is transformed from the extended state to the contracted state or from the contracted state to the extended state, tensions in opposite directions are appropriately applied to both ends of each of all the plate floor members 100 forming the movable passage 10*b*.

When the PBB 1 is transformed from the contracted state to the extended state, the outer tunnel 2 and the inner tunnel 3 move so as to separate from each other, and hence a pulling force is always applied to the wire 107. On the other hand, when the PBB 1 is transformed from the extended state to the contracted state, the outer tunnel 2 and the inner tunnel 3 move so as to approach each other. Therefore, the fixed position of the wire 107 to the outer tunnel 2 (fixed point 23 between the plate floor member 100 and the wire 107) and the fixed point 21 for the wire 107 with respect to the inner tunnel 3 approach each other. In this case, with the pulley 20 alone, the tension reduces and is finally released to generate a slack. Therefore, in order to apply a uniform tension in the entire process of transformation from the extended state to the contracted state of the PBB 1, the pulley 20 is set as a fixed pulley, and a pulley group 22 playing a role as a movable pulley in contrast with the pulley 20 is rotatably fixed and arranged on a rear end 2*b* side of the outer tunnel 2. In this manner, the slack is prevented from being generated in the entire process of transformation from the extended state to the contracted state of the PBB 1. The pulley group 22 includes a first pulley 22*a* and a second pulley group 22*b*. In the wire 107 between the pulley 20 and the wire fixed point 21 arranged on the front end 3*a* side of the inner tunnel 3, first, the wire 107 looped around the first pulley 22*a* is further looped around the second pulley group 22*b*. The first pulley 22*a* and the second pulley group 22*b* are arranged so that the line connecting the rotation center of the first pulley 22*a* and the rotation center of the second pulley group 22*b* forms an angle with a direction of the wire 107 extending from the plate floor member 100 to the pulley 20. It is most preferred to arrange the first pulley 22*a* and the second pulley group 22*b* so that the direction of the wire 107 extending up to the pulley 20 matches with the direction in which the plate floor members 100 of the movable passage 10*b* extend (the longitudinal direction of the fixed passage 11), and this direction is perpendicular to the vertical line connecting the rotation centers of the first pulley 22*a* and the second pulley group 22*b*. In this manner, when the outer tunnel 2 and the inner tunnel 3 move relatively to each other, it is possible to apply an appropriate tension at any positions.

Further, for example, between the wire 107 and the fixed point 21 for the wire 107 in the inner tunnel 3, a limit switch is arranged through intermediation of the tension application device 108. When a predetermined tension is applied to the wire 107, the limit switch operates to stop the operation of approaching or separating between the outer tunnel 2 and the inner tunnel 3.

Second Embodiment

Figure 9:
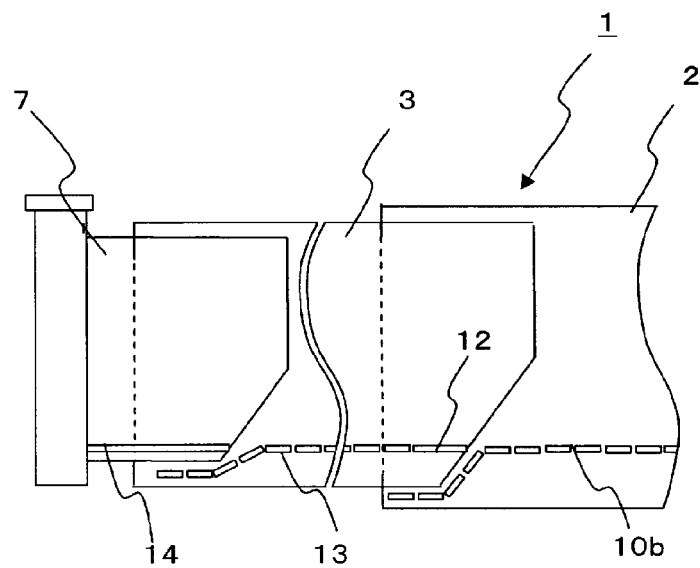
FIG. 9 is a view illustrating a state of a movable passage of a PBB including three tunnels according to a second embodiment of the present invention.

In the first embodiment, description is made of a case of the PBB including two tunnels consisting of the outer tunnel 2 and the inner tunnel 3. However, the present invention is also applicable to a PBB including three tunnels, in which a different third tunnel 7 connected to the airport building is inserted into the inner tunnel 3 (hereinafter referred to as "first tunnel") which is inserted into the outer tunnel 2 (hereinafter referred to as "second tunnel") which is joined to the cab. This case is described with reference to FIG. 9. FIG. 9 is a view illustrating a PBB 1 according to a second embodiment of the present invention. In this case, the first embodiment may be applied between the first tunnel 3 and the second tunnel 2, and between the third tunnel 7 and the first tunnel 3. Thus, although the movable passage is not arranged in the first tunnel 3 in the first embodiment, as a matter of course, the present invention encompasses the case where a movable passage 13 is arranged in the first tunnel 3 in the relationship between the first tunnel 3 and the second tunnel 2. In this case, similarly to the first embodiment, the cab side of each of the first tunnel 3, the second tunnel 2, and the third tunnel 7 is referred to as "front end," and the airport building side thereof is referred to as "rear end."

The second embodiment is similar to the first embodiment in that the second tunnel 2 includes the fixed passage (not shown) and the movable passage 10*b*. In the first embodiment, the first tunnel 3 does not include the movable passage, but in the second embodiment, a fixed passage 12 is mounted to the front end 3*a* side of the first tunnel 3, and the movable passage 13 is mounted on the rear end side of the fixed passage 12 in a pivotable manner. The second embodiment is the same as the first embodiment in that the movable passage 13 includes multiple plate floor members 100, and is the same in the configuration of the guide rail pair for moving the movable passage 13. The third tunnel 7 includes a fixed passage 14. When the PBB 1 is contracted from the extended state, with use of the drive column (not shown), the second tunnel 2 moves so as to approach the first tunnel 3, and further, the first tunnel 3 moves so as to approach the third tunnel 7, relatively with each other. With the series of the movements, the movable passage 10*b* of the second tunnel 2 moves so as to enter below the fixed passage 12 and the movable passage 13 of the first tunnel 3. Further, the movable passage 13 of the first tunnel 3 moves so as to enter below the fixed passage 14 of the third tunnel 7. At this time, the guide rail height of each of the first tunnel 3, the second tunnel 2, and the third tunnel 7 may be set so that the lowering height for the movable passage 10*b* of the second tunnel 2 to enter below the fixed passage 12 and the movable passage 13 of the first tunnel 3 is larger than the lowering height for the movable passage 13 of the first tunnel 3 to enter below the fixed passage 14 of the third tunnel 7. Further, the guide rail height of the third tunnel 7 is set so that the passage surface height of the movable passage 13 matches with the passage surface height of the fixed passage 14 of the third tunnel 7.

INDUSTRIAL APPLICABILITY

The present invention is applicable to a PBB for a passenger aircraft to be installed to an airport building.

This application claims the benefit of Japanese Patent Application No. 2012-034632, filed on Feb. 21, 2012, which is hereby incorporated by reference herein in its entirety.

REFERENCE SIGNS LIST 1 aircraft passenger boarding bridge (PBB)
2 outer tunnel (second tunnel)
3 inner tunnel (first tunnel)
4 rotunda
5 cab
6 drive column
7 third tunnel
10a fixed passage
10b movable passage
11 fixed passage
12 fixed passage
13 movable passage
14 fixed passage

The invention claimed is:
1. An aircraft passenger boarding bridge, comprising:
a first tunnel including a hollow portion and a first fixed passage on which a passenger walks, in the hollow portion; and
a second tunnel into which the first tunnel is inserted from one end side of the second tunnel, the second tunnel including a hollow portion and a second fixed passage on which a passenger walks, wherein the second tunnel having another end side connected to a cab, the second fixed passage being fixed to the another end side,
wherein the second tunnel comprises a movable passage including multiple floor members chained with each other, each of the multiple floor members being pivotably connected with each other at an edge side, one end of the movable passage being pivotably connected to the second fixed passage of the second tunnel,
wherein a passage surface height of the movable passage is the same as a passage surface height of the first fixed passage of the first tunnel,
wherein the first tunnel comprises at least one guide rail extending along a direction of movement,
wherein the multiple floor members has a support rod extending from another edge side of each of the multiple floor members, and
wherein movement of the support rod along the one guide rail causes downward movement of the movable passage below the first fixed passage of the first tunnel when the aircraft passenger boarding bridge is contracted, or upward movement of the movable passage from below the first fixed passage of the first tunnel when the aircraft passenger boarding bridge is extended.
2. An aircraft passenger boarding bridge according to claim 1, wherein the movable passage comprises a roller which is rotatable and fixed with regard to each of the multiple floor members, and
wherein the roller runs on a rolling surface of the one guide rail so that the movement of the support rod along the one guide rail is caused.

3. An aircraft passenger boarding bridge according to claim 1, wherein the second tunnel further comprises another guide rail extending along the direction of the movement, and
wherein the movement of the support rod along the one guide rail is caused.
4. An aircraft passenger boarding bridge according to claim 2, wherein the roller is mounted on the support rod.
5. An aircraft passenger boarding bridge according to claim 3, wherein each of the one guide rail and the another guide rail respectively comprises a pair of one guide rails or a pair of the another guide rail,
wherein a running surface for the roller on the pair of the another guide rails is set to be higher than a running surface for the roller on the pair of one guide rails, and
wherein a distance between the running surface on the pair of the another guide rails is set to be larger than a distance between the running surface on the pair of one guide rails.
6. An aircraft passenger boarding bridge according to claim 1, wherein the support rod is biased in a biasing direction in which the support rod extends out from the multiple floor members by a biasing spring whose one end is fixed to the support rod and another end is fixed to one of the multiple floor members, the support rod being contractable in a direction opposite to the biasing direction, and
wherein the aircraft passenger boarding bridge further comprises a wall surface for contracting the support rod when the support rod is transferred from the another guide rail to the one guide rail.
7. An aircraft passenger boarding bridge according to claim 1, further comprising a tension application device whose one end is connected to the second tunnel and another end is connected to an end of the movable passage of the second tunnel to apply an extending tension into the movable passage.
8. An aircraft passenger boarding bridge according to claim 1, further comprising a wire whose one end is connected to another end of the movable passage which is opposite to the one end connected to the second fixed passage, and another end is connected to the first tunnel, the wire applying a tension of pulling both ends of the movable passage through a pulley in accordance with relative movement between the first tunnel and the second tunnel.
9. An aircraft passenger boarding bridge according to claim 1, further comprising a third tunnel which comprises a third fixed passage on which the passenger walks in a hollow portion of the third fixed passage, the third tunnel being inserted into the first tunnel,
wherein the first tunnel further comprises a second movable passage including multiple floor members chained with each other, each of the multiple floor members being pivotably connected with each other at an edge side, one end of the movable passage being pivotably connected to the second fixed passage of the first tunnel,
wherein a passage surface height of the movable passage is the same as a passage surface height of the first fixed passage of the third tunnel,
wherein the second movable passage causes downward movement toward below the third fixed passage of the third tunnel when the aircraft passenger boarding bridge is contracted, or upward movement from below the third fixed passage of the third tunnel when the aircraft passenger boarding bridge is extended.
10. An aircraft passenger boarding bridge according to claim 9,
wherein the third tunnel comprises at least one guide rail extending along a direction of movement, wherein the multiple floor members forming the second movable passage of the first tunnel has a support rod extending from another edge side of each of the multiple floor members, and wherein the upward or downward movement of the second movable passage is caused by movement of the support rod along the one guide rail.

* * * * *